US012759539B2

(12) United States Patent
Lee et al.

(10) Patent No.: US 12,759,539 B2
(45) Date of Patent: Oct. 13, 2026

(54) VEHICLE AND METHOD OF CONTROLLING THE SAME

(71) Applicants: Hyundai Motor Company, Seoul (KR); Kia Corporation, Seoul (KR)

(72) Inventors: Sangmin Lee, Seoul (KR); Dae Seok Jeon, Hwaseong-si (KR); Dong Hyun Sung, Hwaseong-si (KR); Tae-Geun An, Yeongju-si (KR); Hyoungjong Wi, Seoul (KR); Joon Ho Lee, Seoul (KR); Eungseo Kim, Gwacheon-si (KR); Yongseok Kwon, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 501 days.

(21) Appl. No.: 18/189,755

(22) Filed: Mar. 24, 2023

(65) Prior Publication Data

US 2023/0365126 A1 Nov. 16, 2023

(30) Foreign Application Priority Data

May 11, 2022 (KR) ........................ 10-2022-0057968

(51) Int. Cl.
*B60W 30/09* (2012.01)
*B60W 30/095* (2012.01)

(52) U.S. Cl.
CPC ........ *B60W 30/09* (2013.01); *B60W 30/0956* (2013.01); *B60W 2420/403* (2013.01); *B60W 2420/408* (2024.01)

(58) Field of Classification Search
CPC ............. B60W 30/09; B60W 30/0956; B60W 2420/403; B60W 2420/408; B60W 2554/806; B60W 10/18; B60W 10/20; B60W 2552/53; B60W 2554/20; B60W 2554/40; B60W 2554/4026; B60W 2554/4029; B60W 40/06; B60W 2520/14; B60W 2540/18; B60T 2201/022; B60T 2210/32; B60T 7/22; G01S 13/867; G01S 13/931; G06V 20/58; G06V 20/588
See application file for complete search history.

(56) References Cited

U.S. PATENT DOCUMENTS

| | | | | |
|---|---|---|---|---|
| 9,545,921 | B2 * | 1/2017 | Wolf | B60W 30/0953 |
| 10,688,990 | B2 * | 6/2020 | Kim | B60W 30/09 |
| 11,577,720 | B2 * | 2/2023 | Miyamoto | B60W 30/095 |
| 2002/0091479 | A1 * | 7/2002 | Maruko | B60T 7/22 701/96 |

(Continued)

FOREIGN PATENT DOCUMENTS

| | | |
|---|---|---|
| JP | 2020-155007 | 9/2020 |
| JP | 2020-175798 | 10/2020 |

(Continued)

*Primary Examiner* — Peter D Nolan
*Assistant Examiner* — Demetra R Smith-Stewart
(74) *Attorney, Agent, or Firm* — Fish & Richardson P.C.

(57) ABSTRACT

A vehicle includes a camera configured to capture an outside of the vehicle, a radar configured to detect an object outside the vehicle, and a controller configured to acquire a virtual path of the vehicle based on image data output from the camera and radar data output from the radar and perform forward collision-avoidance braking based on maintaining a time in which the object intersects the virtual path of the vehicle.

18 Claims, 11 Drawing Sheets

(56) References Cited

U.S. PATENT DOCUMENTS

| | | | | |
|---|---|---|---|---|
| 2008/0097700 | A1* | 4/2008 | Grimm | G08G 1/165<br>701/301 |
| 2018/0339670 | A1* | 11/2018 | Nishimura | B60W 10/20 |
| 2018/0357903 | A1 | 12/2018 | Fukunaga | |
| 2019/0291730 | A1 | 9/2019 | Kamiya et al. | |
| 2020/0361455 | A1 | 11/2020 | Murakami | |
| 2021/0253092 | A1* | 8/2021 | Miyamoto | B60W 30/09 |
| 2022/0144255 | A1* | 5/2022 | Seong | B60W 30/09 |
| 2023/0192079 | A1* | 6/2023 | Shimizu | B60W 30/0953<br>701/301 |

FOREIGN PATENT DOCUMENTS

| | | | | |
|---|---|---|---|---|
| JP | 2021-064033 | | 4/2021 | |
| KR | 20200133122 A | * | 11/2020 | B60W 30/08 |

* cited by examiner

| TYPE | Index | WHETHER TO CONTROL |
|---|---|---|
| V-① | 1 | NORMAL CONTROL WITHOUT LANE INFORMATION |
| V-② | 1 | |
| V-③ | 1 | |
| V-④ | 1 | |
| T-① | 1 | |
| T-② | 1 | |
| C-① | 1 | |
| C-② | 1 | |
| L-① | 0 | |
| L-② | 0 | |
| P-① | 0 | |
| P-② | 0 | |

| TYPE | Index | WHETHER TO CONTROL |
|---|---|---|
| V-① | 1 | PREVENTION OF SENSITIVE CONTROL DUE TO T-①, C-①,② |
| V-② | 1 | |
| V-③ | 1 | |
| V-④ | 1 | |
| T-① | 0 | |
| T-② | 1 | |
| C-① | 0 | |
| C-② | 0 | |
| L-① | 0 | |
| L-② | 0 | |
| P-① | 0 | |
| P-② | 0 | |

| TYPE | Index | WHETHER TO CONTROL |
|---|---|---|
| V-① | 1 → 0 | PREVENTION OF SENSITIVE CONTROL DUE TO T-①, C-①, ② |
| V-② | 1 → 0 | |
| V-③ | 1 → 0 | |
| V-④ | 1 → 0 | |
| T-① | 0 | |
| T-② | 1 | |
| C-① | 0 | |
| C-② | 0 | |
| L-① | 0 | |
| L-② | 0 | |
| P-① | 0 | |
| P-② | 0 | |

| TYPE | Index | WHETHER TO CONTROL |
|---|---|---|
| V-① | 1 | SECURE ADDITIONAL AMOUNT OF DECELERATION |
| V-② | 1 | |
| V-③ | 1 | |
| V-④ | 1 | |
| T-① | 0 → 1 | |
| T-② | 0 → 1 | |
| C-① | 0 → 1 | |
| C-② | 0 → 1 | |
| L-① | 1 | |
| L-② | 0 → 1 | |
| P-① | 0 → 1 | |
| P-② | 0 → 1 | |

VEHICLE AND METHOD OF CONTROLLING THE SAME

CROSS-REFERENCE TO RELATED APPLICATION

This application claims the benefit of Korean Patent Application No. 10-2022-0057968, filed on May 11, 2022, in the Korean Intellectual Property Office, the entire disclosure of which is incorporated herein by reference.

TECHNICAL FIELD

The present disclosure is related to a vehicle and a method of controlling the same, and more specifically, to a vehicle equipped with a forward collision-avoidance assist (FCA) function and a method of controlling the same.

BACKGROUND

Vehicles may be equipped with an advanced driver assistance system (ADAS) to avoid various collisions with other vehicles while traveling on a road.

A forward collision-avoidance assist (FCA) function which is one function of the ADAS is a function of preventing collisions with other vehicles detected in front of the vehicle and avoids the collisions in consideration of distance relationships and a lane line relationship with other vehicles through a camera and a radar provided in the vehicle.

The conventional FCA function has a problem in that a normal operation is impossible on a road without lane lines or braking control occurs in a situation in which the FCA is not required in consideration of only an estimated time of collision with other vehicles without considering the lane line.

SUMMARY

Therefore, it is an aspect of the present disclosure to provide a method of controlling a vehicle which normally operates a forward collision-avoidance assist (FCA) function on a road without lane line and prevents sensitive control.

In accordance with one aspect of the present disclosure, a vehicle includes a camera installed in the vehicle to have an external field of view of the vehicle and configured to acquire image data for detecting a lane line and an object in the external field of view, a radar installed in the vehicle to have the external field of view of the vehicle and configured to acquire radar data for detecting the object in the external field of view, and a controller including at least one processor configured to process the image data and the radar data and configured to control a braking device based on the processed results, wherein the controller detects traveling straightness of the vehicle and traveling straightness of the object in a state in which the lane line is not detected and controls the braking device so that a forward collision-avoidance assist (FCA) function is performed when the traveling straightness of the vehicle and the traveling straightness of the object are greater than or equal to a certain level and a time in which the object intersects a virtual path of the vehicle is a certain time or less and is maintained for a preset first time or more.

The controller may calculate a first index which is an index of traveling straightness of the vehicle based on at least one of a steering angle of the vehicle, a yaw rate of the vehicle, and a lateral movement amount of the vehicle, calculate the first index as 1 when the traveling straightness of the vehicle is greater than or equal to a certain level, and calculate the first index as zero when the traveling straightness of the vehicle is smaller than the certain level.

The controller may calculate a second index which is an index of traveling straightness of the object based on at least one of a heading angle of the object and a lateral position of the object with respect to the vehicle, calculate the second index as 1 when the traveling straightness of the object is greater than or equal to a certain level, and calculate the second index as zero when the traveling straightness of the object is smaller than the certain level.

The controller may calculate a third index, which is an index of possibility of collision between the vehicle and the object, as 1 when a first condition in which the time in which the object intersects the virtual path of the vehicle is a certain time or less and is maintained for a preset first time or more and a second condition in which an area of a lateral overlap region in which the virtual path of the vehicle overlaps a virtual path of the object is greater than or equal to a preset size are satisfied, and calculate the third index as zero when at least one of the first condition and the second condition is not satisfied.

The controller may control a forward collision-avoidance assist (FCA) function not to be performed when at least one of the first index, the second index, and the third index is zero.

When a lane line is detected, the object intersecting a lane is detected while the object travels at a center of the lane, and when a time in which the object intersects the virtual path of the vehicle is a certain time or less and is maintained for a preset second time or more, the controller may increase an amount of braking of a braking device.

The controller may calculate a fourth index, and calculates the fourth index as 1 when the object intersecting the lane is detected while the object travels at the center of the lane and calculates the fourth index as zero when the object intersecting the lane is not detected.

The controller may calculate a fifth index, which is an index of the possibility of collision between the vehicle and the object, as 1 when a third condition in which the vehicle and the object are positioned on the same lane for a certain time or more and a fourth condition in which the time in which the object intersects the lane of the vehicle is the certain time or less and is the preset second time or more are satisfied, and calculate the fifth index as zero when at least one of the third condition and the fourth condition is not satisfied.

The controller may output the amount of braking as a pre-stored amount of braking when at least one of the fourth index and the fifth index is zero.

The controller may set the preset second time to be greater than the preset first time.

In accordance with another aspect of the present disclosure, a method of controlling a vehicle includes acquiring image data for detecting a lane line and an object and radar data for detecting the object, processing the image data and the radar data, detecting traveling straightness of the vehicle and traveling straightness of the object in a state in which the lane line is not detected, and controlling a braking device so that a forward collision-avoidance assist (FCA) function is performed based on the traveling straightness of the vehicle and the traveling straightness of the object being a certain level or more and a time in which the object intersects a virtual path of the vehicle is a certain time or less and is maintained for a preset first time or more.

The method of the vehicle according to another aspect may further include calculating a first index which is an index of traveling straightness of the vehicle based on at least one of a steering angle of the vehicle, a yaw rate of the vehicle, and a lateral movement amount of the vehicle, calculating the first index as 1 when the traveling straightness of the vehicle is greater than or equal to a certain level, and calculating the first index as zero when the traveling straightness of the vehicle is smaller than the certain level.

The method of the vehicle according to another aspect may include calculating a second index which is an index of the traveling straightness of the object based on at least one of a heading angle of the object and a lateral position of the object with respect to the vehicle, calculating the second index as 1 when the traveling straightness of the object is greater than or equal to a certain level, and calculating the second index as zero when the traveling straightness of the object is smaller than the certain level.

The method of the vehicle according to another aspect may further include calculating a third index, which is an index of possibility of collision between the vehicle and the object, as 1 when a first condition in which the time in which the object intersects the virtual path of the vehicle is a certain time or less and is maintained for a preset first time or more and a second condition in which an area of a lateral overlap region in which the virtual path of the vehicle overlaps a virtual path of the object is greater than or equal to a preset size are satisfied, and calculating the third index as zero when at least one of the first condition and the second condition is not satisfied.

The method of the vehicle according to another aspect may further include controlling a forward collision-avoidance assist (FCA) function not to be performed when at least one of the first index, the second index, and the third index is zero.

The method of the vehicle according to another aspect may further include, when a lane line is detected, the object intersecting a lane is detected while the vehicle travels at a center of the lane which is between the lane lines, and a time in which the object intersects the lane of the vehicle is a certain time or less and is maintained for a preset second time or more, increasing an amount of braking of a braking device.

The method of the vehicle according to another aspect may further include calculating a fourth index, wherein calculating the fourth index as 1 when the object intersecting the lane is detected while the vehicle travels at the center of the lane which is between the lane lines, and calculating the fourth index as zero when the object intersecting the lane is not detected.

The method of the vehicle according to another aspect may further include calculating a fifth index, which is an index of the possibility of collision between the vehicle and the object, as 1 when a third condition in which the vehicle and the object are positioned on the same lane for a certain time or more and a fourth condition in which the time in which the object intersects the lane of the vehicle is the certain time or less and is the preset second time or more are satisfied, and calculating the fifth index as zero when at least one of the third condition and the fourth condition is not satisfied.

The method of the vehicle according to another aspect may further include outputting the amount of braking as a pre-stored amount of braking when at least one of the fourth index and the fifth index is zero.

The preset second time may be set to be greater than the preset first time.

DETAILED DESCRIPTION

Figure 1:
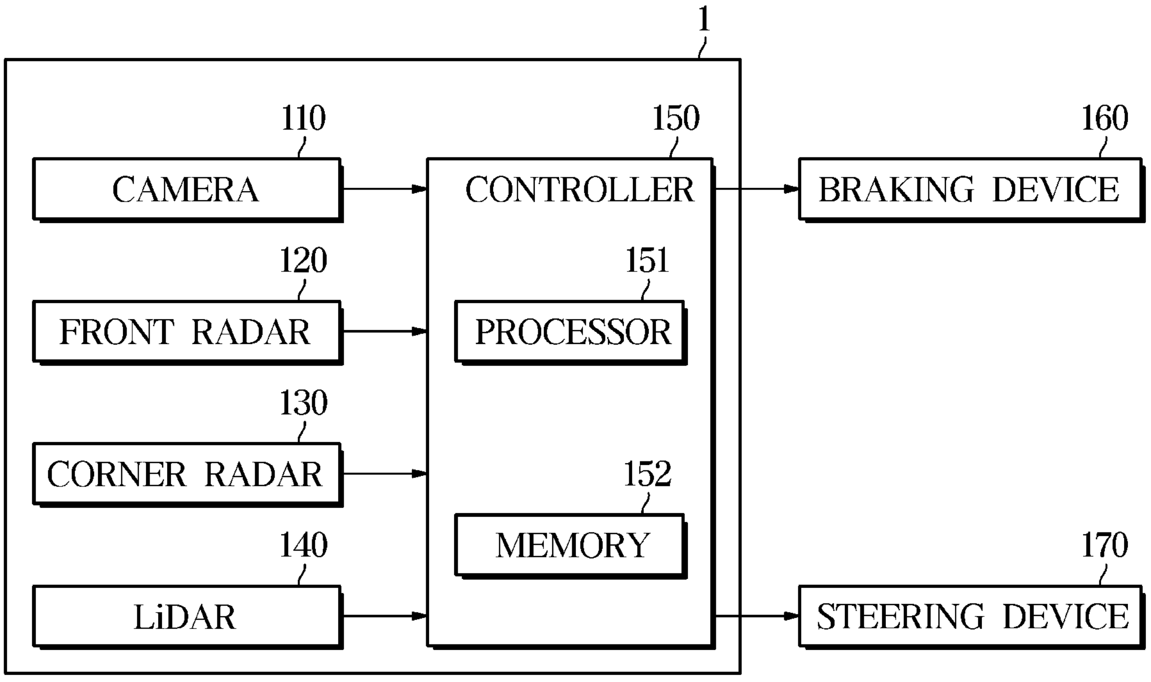
FIG. 1 is a control block diagram illustrating an example of a vehicle.
Figure 2:
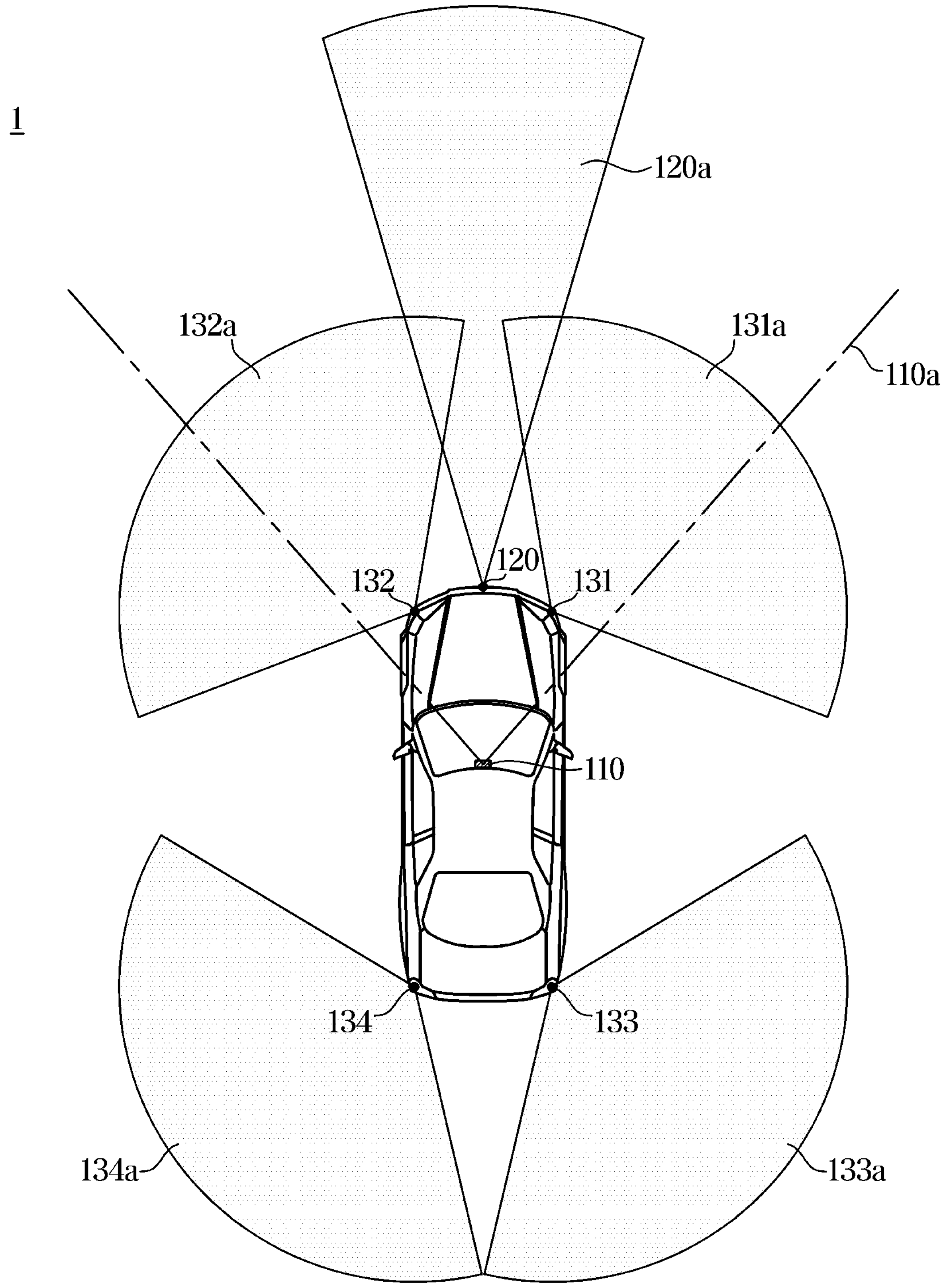
FIG. 2 is a diagram illustrating an example of a detection region of a camera and a radar included in a vehicle.

FIG. 1 is a control block diagram illustrating an example of a vehicle, and FIG. 2 is a diagram illustrating an example of a detection region of a camera and a radar included in the vehicle.

A vehicle 1 includes an advanced driver assistance system 100, a braking device 160, and a steering device 170.

The braking device 160 may temporarily brake wheels of the vehicle 1 in response to the driver's braking intention through a brake pedal and/or slip of the wheels and/or a data processing result of the advanced driver assistance system 100.

The steering device 170 may temporarily or continuously control a progress direction of the vehicle 1 in response to the driver's steering will through a steering wheel and/or the data processing result of the advanced driver assistance system 100.

The advanced driver assistance system 100 may assist the driver to operate (drive, brake, and steer) the vehicle 1. For example, the advanced driver assistance system 100 may detect surrounding environments of the vehicle 1 (e.g., other vehicles, pedestrians, cyclists, lane lines, and road signs) and control the driving and/or braking and/or steering of the vehicle 1 in response to the detected environments. Hereinafter, an object includes all other vehicles, cyclists, and the like, which are objects which may collide with the traveling vehicle 1 in the surrounding environments.

A controller 150 may transmit a driving control signal, a braking signal, and a steering signal to the braking device 160 and/or the steering device 170 through a vehicle communication network NT.

The advanced driver assistance system 100 may provide various functions to the driver. For example, the advanced driver assistance system 100 may provide lane departure warning (LDW), lane keeping assist (LKA), high beam assist (HBA), an autonomous emergency braking (AEB), traffic sign recognition (TSR), smart cruise control (SCC), blind spot detection (BSD), forward collision-avoidance assist (FCA), and the like.

The advanced driver assistance system 100 may include at least one of a camera 110, a front radar 120, a plurality of corner radars 130 (131, 132, 133, and 134), and a LiDAR 140.

The camera 110 may include a front camera for securing a front field of view 110*a* (see FIG. 2) forward from the vehicle 1 and a side camera for securing a side field of view sideward from the vehicle 1. In this case, the front camera may detect an object moving in the front field of view or an object traveling in an adjacent lane in the front and side field of views.

The front camera may be installed on a front windshield of the vehicle 1. The front camera may capture the front of the vehicle 1 and acquire image data of a front view of the vehicle 1. The image data of the front view of the vehicle 1 may include position information on at least one of other vehicles, pedestrians, cyclists, lane lines, curbs, guard rails, street trees, and street lights positioned in front of the vehicle 1.

The side camera may be installed on a B-pillar side of the vehicle 1. The side camera may acquire image data of the side of the vehicle 1 by capturing the side of the vehicle 1.

In other words, the camera 110 acquires the image data so that the controller 150 processes the image data to detect an object included in the image data and acquires motion information and the like on the object.

The front radar 120 may have a field of sensing 120*a* forward from the vehicle 1. The front radar 120 may be installed, for example, on a grille or a bumper of the vehicle 1.

The front radar 120 may include a transmission antenna (or transmission antenna array) configured to radiate transmission waves toward the front of the vehicle 1 and a reception antenna (or reception antenna array) configured to receive reflected waves reflected from obstacles.

The front radar 120 may acquire front radar data from the transmission waves transmitted by the transmission antenna and the reflected waves received by the reception antenna.

The front radar data may include position information and speed information on the object, that is, other vehicles, pedestrians, or cyclists positioned in front of the vehicle 1.

The front radar 120 may calculate a relative distance to the obstacle based on a phase difference (or time difference) between the transmitted wave and the reflected wave and calculate a relative speed of the obstacle based on a frequency difference between the transmitted wave and the reflected wave. The front radar 120 may transmit the front radar data to the controller 150.

A plurality of corner radars 130 include a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1.

The first corner radar 131 may have a field of sensing 131*a* toward the front right side of the vehicle 1. The first corner radar 131 may be installed on a right side of a front bumper of the vehicle 1.

The second corner radar 132 may have a field of sensing 132*a* toward a front left side of the vehicle 1 and may be installed on a left side of the front bumper of the vehicle 1.

The third corner radar 133 may have a field of sensing 133*a* toward the rear right side of the vehicle 1 and may be installed on a right side of a rear bumper of the vehicle 1.

The fourth corner radar 134 may have a field of sensing 134*a* toward a rear left side of the vehicle 1 and may be installed on a left side of the rear bumper of the vehicle 1.

Each of the first, second, third, and fourth corner radars 131, 132, 133, and 134 may include the transmission antenna and the reception antenna.

The first, second, third, and fourth corner radars 131, 132, 133, and 134 may acquire first corner radar data, second corner radar data, third corner radar data, and fourth corner radar data, respectively.

The first corner radar data may include distance information and speed information on an object positioned on the front right side of the vehicle 1.

The second corner radar data may include distance information and speed information on an object positioned on the front left side of the vehicle 1.

The third and fourth corner radar data may include distance information and speed information on objects positioned on the rear right side of the vehicle 1 and the rear left side of the vehicle 1.

The first, second, third, and fourth corner radars 131, 132, 133, and 134 may transmit the first, second, third, and fourth corner radar data to the controller 150, respectively.

The LiDAR 140 may be installed in the vehicle 1 to have an external field of view of the vehicle 1. For example, the LiDAR 140 may be mounted on the front bumper, the radiator grille, a hood, a roof, doors, side mirrors, a tailgate, a trunk lid, or a fender.

The controller 150 may process the image data of the camera 110, the front radar data of the front radar 120, and the corner radar data of the plurality of corner radars 130 and generate control signals for controlling the braking device 160 and/or the steering device 170.

The controller 150 may include an image signal processor which is a processor 151 configured to process the image data of the camera 110 and/or a digital signal processor configured to process the radar data of the radars 120 and 130 and/or a micro control unit (MCU) configured to generate a braking signal.

When performing the autonomous traveling mode, the controller 150 may recognize a lane line on the road by performing an image processing upon receiving the image information (i.e., image data) from the camera 110, recognize a host lane on which a host vehicle travels based on position information of the recognized lane line, determine whether both lane lines of the host lane have been recognized, and control the autonomous traveling based on both recognized lane lines when it is determined that both lane lines have been recognized.

When performing a collision avoidance mode, the controller 150 may identify objects in the image based on the image information acquired by the camera 110 and may also compare information on the identified objects with object information stored in a memory 152 to determine whether the objects in the image are obstacles in a fixed state or obstacles in a moving state.

The controller 150 may detect obstacles (e.g., other vehicles, pedestrians, cyclists, curbs, guard rails, street trees, and street lights) in front of the vehicle 1 based on the image data of the camera 110 and the front radar data of the radar 120.

In addition to the camera 110, the controller 150 may acquire information on the object based on LiDAR data of the LiDAR 140.

The memory 152 may store a program and/or data for processing the image data, a program and/or data for processing the radar data, and a program and/or data for generating a braking signal and/or a warning signal by the processor 151.

The memory 152 may temporarily store the image data received from the front camera 110 and/or the radar data received from the radars 120 and 130 and temporarily store the processed results of the image data and/or radar data of the memory 152.

The memory 152 may be implemented as at least one of non-volatile memory devices, such as a cache, a read only memory (ROM), a programmable ROM (PROM), an erasable programmable ROM (EPROM), an electrically erasable programmable ROM (EEPROM), and a flash memory, volatile memory devices, such as a random access memory (RAM), and storage media, such as a hard disk drive (HDD) and a CD-ROM, but the present disclosure is not limited thereto.

Figure 3:
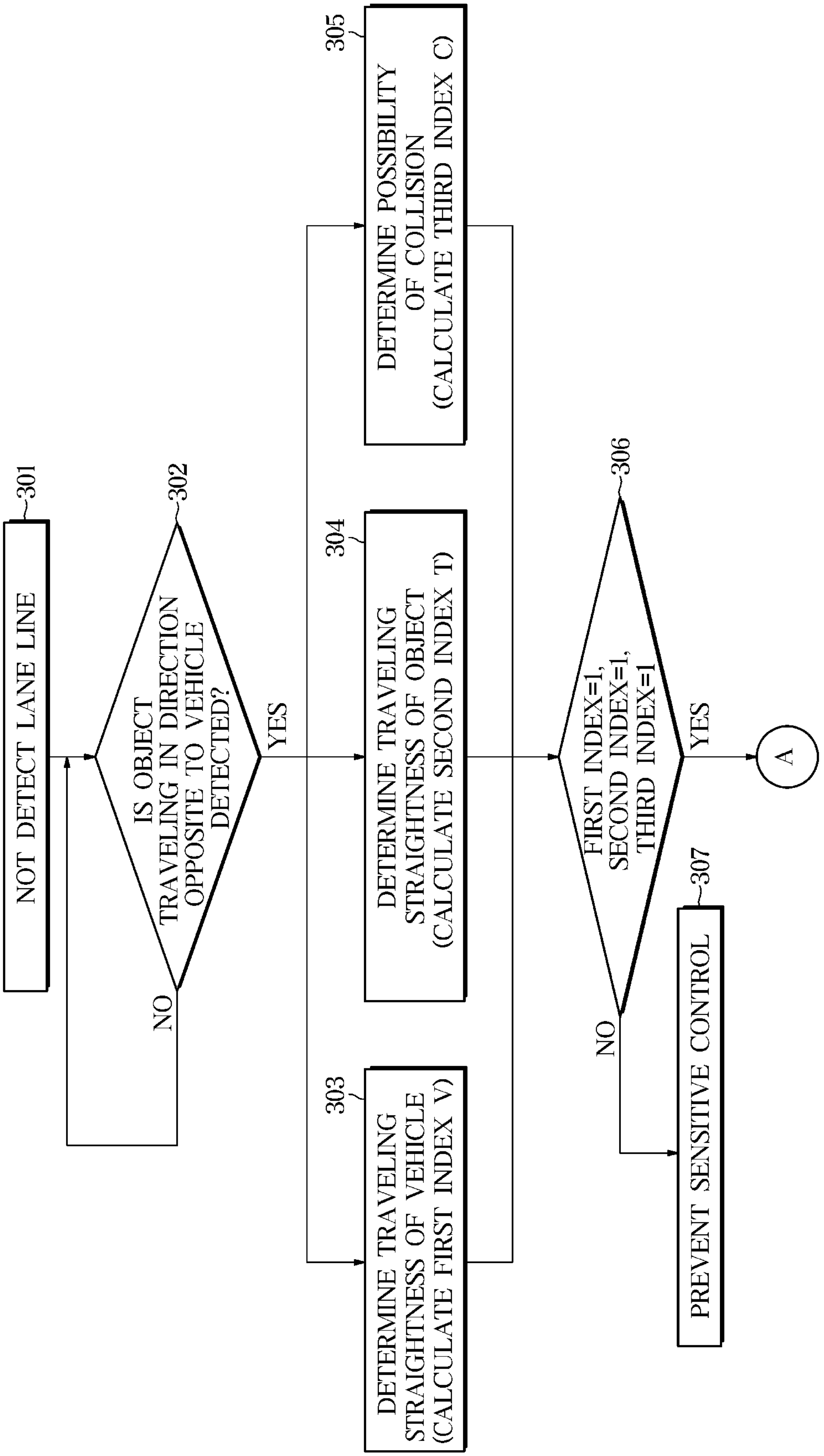
FIG. 3 is a flowchart of an example of a method of controlling a vehicle.
Figure 4:
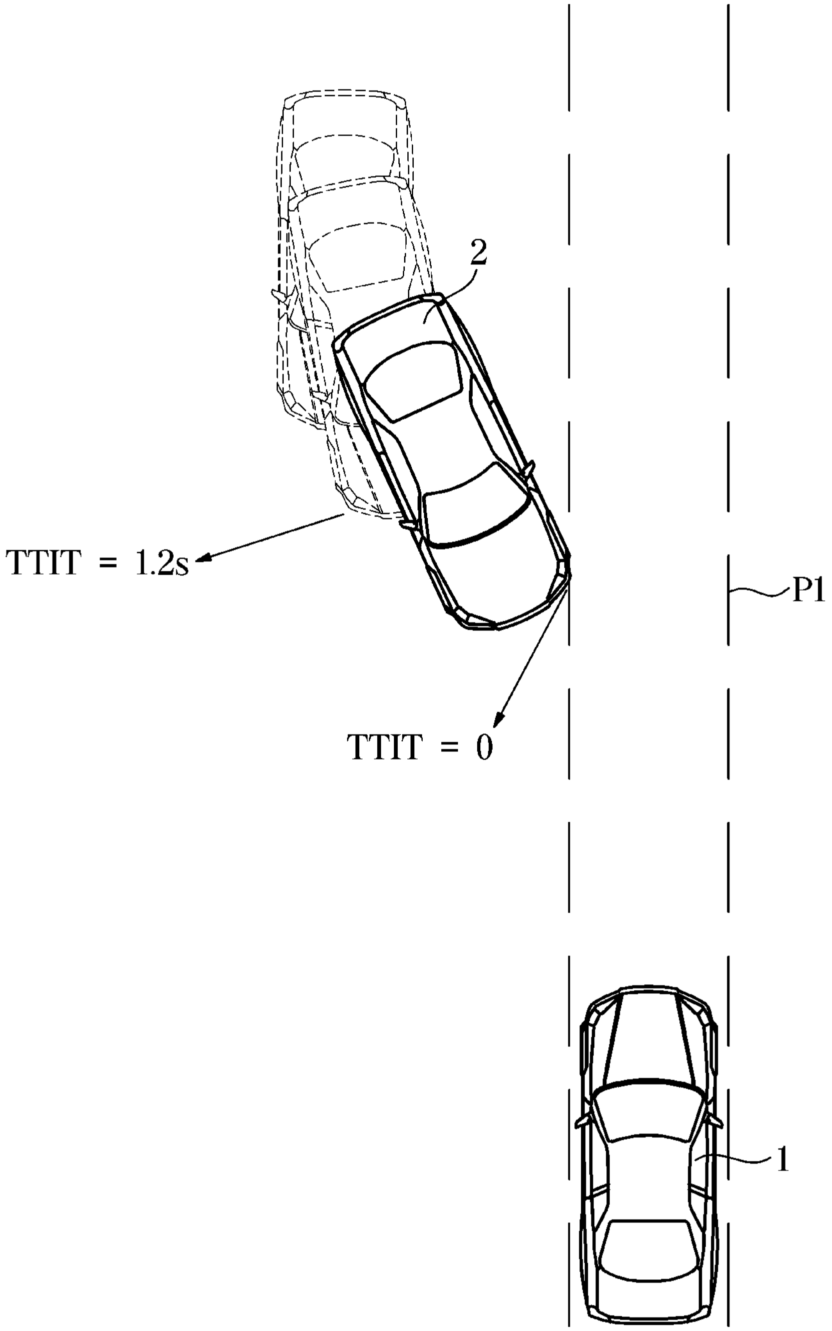
FIG. 4 is a diagram for describing an example of a process of calculating a third index.
Figure 5:
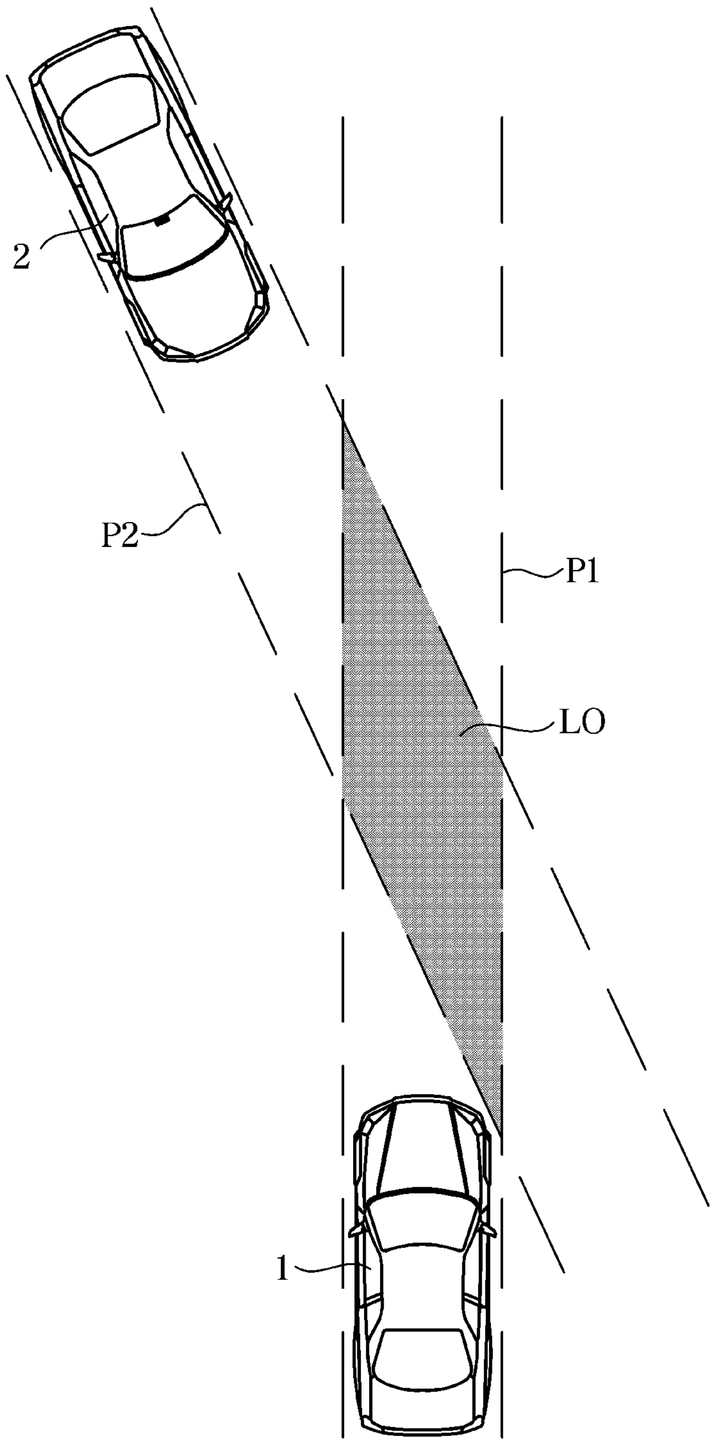
FIG. 5 is a diagram for describing an example of the process of calculating the third index.
Figure 6:
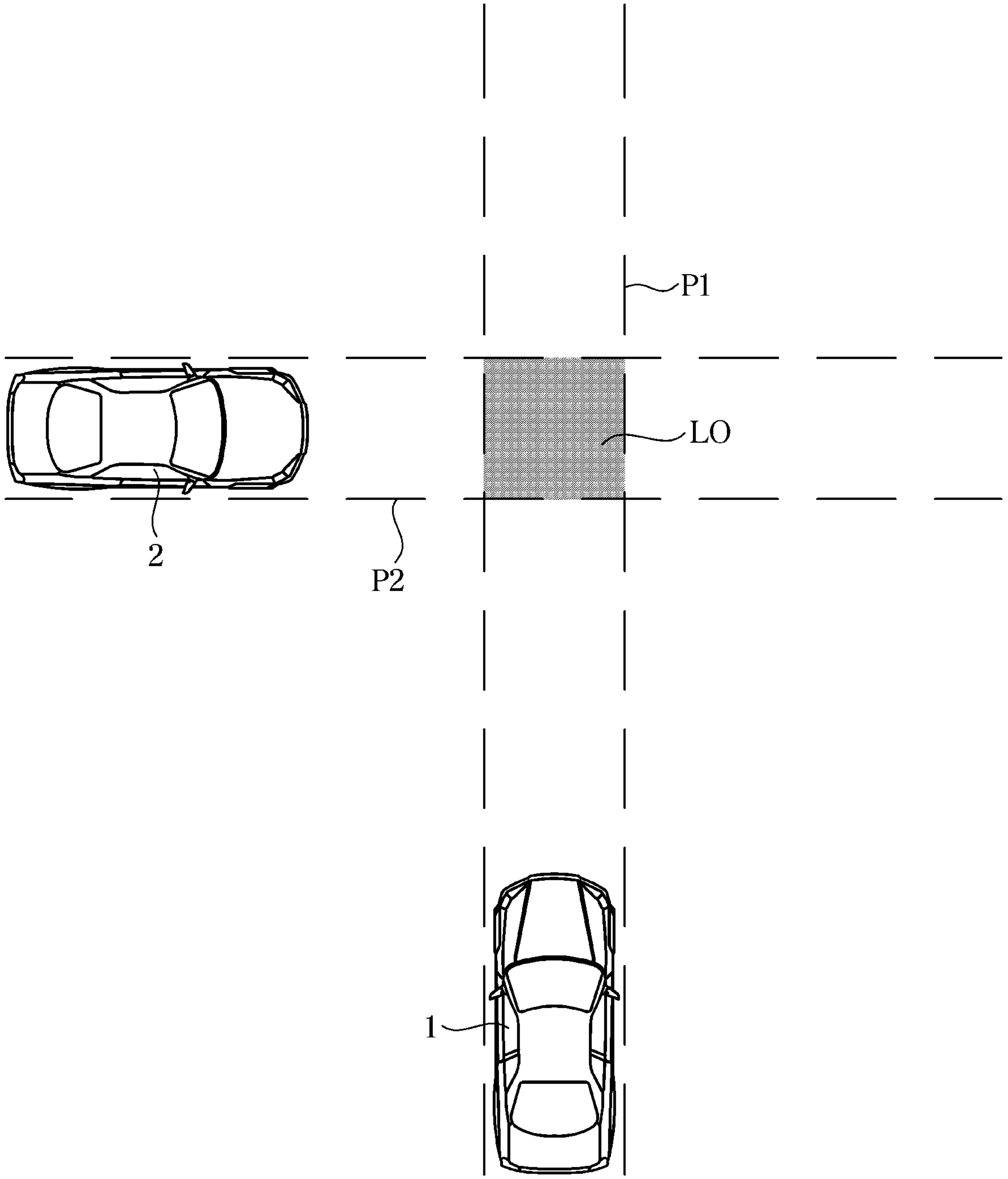
FIG. 6 is a diagram for describing an example of the process of calculating the third index.

FIG. 3 is a flowchart of an example of a method of controlling a vehicle, and FIGS. 4 to 6 are diagrams for describing an example of a process of calculating a third index. The process of calculating the third index related to the collision possibility determination in FIG. 3 will be described with reference to FIGS. 4 to 6.

In a situation in which a lane line is not detected while the vehicle 1 travels (301), the controller 150 detects an object 2 traveling in a direction opposite to the vehicle (302). In some implementations, it is possible to implement the collision avoidance function to an oncoming vehicle approaching from the front even without lane line information. According to the disclosed disclosure, it is possible to perform a forward collision-avoidance assist (FCA) function according to its own determination criteria even without relying on distinction of lanes even on an atypical road where there are no lane lines or signs on the road surface.

The controller 150 may control the braking device 160 for the FCA function with reference to result values of a first index V, a second index T, and a third index P. The conventional FCA function is a method of recognizing a lane line and performing emergency braking when a limit point of a time to collision (TTC) with the object 2 in the same lane line is reached. Therefore, lane information included in the image data or precise map data is essential, and in the case of relying on only the TTC without lane line information, a malfunction of the FCA function occurs even in a situation in which the emergency braking is not required.

Therefore, in some implementations, whether substantial collision may occur between the vehicle 1 and the object 2 is determined through the first index V, the second index T, and the third index P.

The controller 150 calculates the first index V for determining the traveling straightness of the vehicle 1 (303).

The first index V is an index for determining the traveling straightness of the vehicle 1, and the controller 150 may calculate the first index V as 1 when all of a condition in which a steering angle of the vehicle 1 is within a certain range, a condition in which a yaw rate of the vehicle 1 is within a certain range, and a condition in which a lateral movement amount of the vehicle is within a certain range are satisfied and calculate the first index V as zero when any one condition is not satisfied.

For example, the controller 150 may calculate the first index V as 1 when the steering angle of the steering wheel is in a range of −5° to +5°, an output value of a yaw rate sensor is in a range of −1°/sec to +1°/sec and the lateral position movement amount and movement prediction amount of the vehicle 1 are in a range of −0.1 m to +0.1 m. However, the example related to the above-described numerical values is merely one example, and the numerical values may be set to various values.

When calculating the first index V as 1, the controller 150 may estimate that the behavior of the vehicle 1 is close to traveling straight.

Additionally, the controller 150 may further consider the driver's intention to move in a lateral direction as a criterion for calculating the first index V. For example, in calculating the first index V by determining the driver's intention to move in the lateral direction in consideration of a signal of a sensor configured to detect the driver's grip on the steering wheel and/or the driver's field of view through an iris sensor or an indoor camera, the controller 150 may additionally consider the driver's intention to move in a lateral direction in addition to the conditions of the steering angle, the yaw rate, and the lateral movement amount.

The controller 150 may determine at least one of the above-described conditions according to the setting and output the first index V as 1 or 0 according to whether the conditions are satisfied.

The controller 150 calculates the second index T for determining the traveling straightness of the object 2 (304).

The second index T is an index for determining the traveling straightness of the object 2, and the controller 150 may calculate the second index T as 1 when both a condition in which a heading angle of the object 2 is within a certain range and a condition in which a lateral position of the object 2 with respect to the vehicle 1 is within a certain range are satisfied and calculate the second index T as zero when any one is not satisfied.

For example, the controller 150 may calculate the second index T as 1 when the heading angle of the object 2 is in a range of −2° to +2° and the lateral position of the object 2 with respect to the vehicle 1 is in a range of −2.0 m to +2.0 m. However, the example related to the above-described numerical values is merely one example, and the numerical values may be set to various values.

When calculating the second index T as 1, the controller 150 may estimate that the movement of the object 2 is close to going straight.

The controller 150 may determine at least one of the above-described conditions according to the settings and output the second index T as 1 or 0 according to whether the conditions are satisfied.

The controller 150 calculates the third index C for determining the possibility of collision between the vehicle 1 and the object 2 (305).

The third index C is an index for determining the possibility of collision between the vehicle 1 and the object 2, and the controller 150 acquires a time to intersect target (TTIT) at which the object 2 intersects a virtual path of the vehicle 1 and a lateral overlap region which is an overlapping region between the virtual path of the vehicle 1 and a virtual path of the object 2 in order to calculate the third index C. In other words, the result value of the third index C may be determined depending on whether two conditions are satisfied.

Referring to FIG. 4, the controller 150 calculates the TTIT, which is a time until the object 2 intersects a virtual path P1 which is an expected traveling path of the vehicle 1. At this time, when the TTIT is smaller than or equal to a certain time and the TTIT is maintained for a certain time or more, it is considered that one of the conditions for calculating the third index C is satisfied.

As another condition, the controller 150 may acquire the lateral overlap region which is the overlapping region between the virtual path of the vehicle 1 and the virtual path of the object 2 and determine another condition based on an area of the lateral overlap region.

For example, an area of a lateral overlap region L0 which is the overlapping region between the virtual path P1 of the vehicle 1 and a virtual path P2 of the object 2 in FIG. 5 has a different value from that of a lateral overlap region L0 between the virtual path P1 of the vehicle 1 and the virtual path P2 of the object 2 in FIG. 6. When directions of the vehicle 1 and the object 2 face each other, the lateral overlap region may have a greater value as their lateral distances are closer. For example, when the vehicle 1 and the object 2 face each other on a straight line, the area of the lateral overlap region has an unlimited area value. In addition, as shown in FIG. 6, when a traveling direction of the vehicle 1 is perpendicular to a traveling direction of the object 2, the area of the lateral overlap region has a minimum value. Based on the geometrical feature, the controller 150 determines that one of the conditions for calculating the third index C as 1 is satisfied when the area of the lateral overlap region is greater than or equal to a preset size.

The controller 150 can calculate the third index, which is an index of the possibility of collision between the vehicle 1 and the object 2, as 1 when a first condition in which the time in which the object 2 intersects the virtual path of the vehicle 1 is a certain time or less and is maintained for a preset first time or more and a second condition in which the area of the lateral overlap region in which the virtual path of the vehicle 1 overlaps the virtual path of the object 2 is a preset size or more are satisfied and calculates the third index as zero when at least one of the first condition and the second condition is not satisfied.

Meanwhile, in order to prevent sensitive control, the controller 150 controls the FCA function not to be performed to prevent the sensitive control (307) when at least one of the first index V, the second index T, and the third index C is zero.

When the FCA function is operated without considering the lane line, the sensitive control is highly likely to occur in various road environments, such as the behavior of each of the vehicle 1 and the oncoming vehicle in an alleyway situation, a point where a straight road meets a curved road with a large radius of curvature when the oncoming vehicle from the front is detected. Therefore, in some implementations, it is possible to prevent the sensitive control based on the output values of the first index V, the second index T, and the third index C.

When all of the first index V, the second index T, and the third index C are 1, a process of additionally securing the amount of braking against the object 2 is performed. This will be described in detail with reference to FIG. 7.

Figure 7:
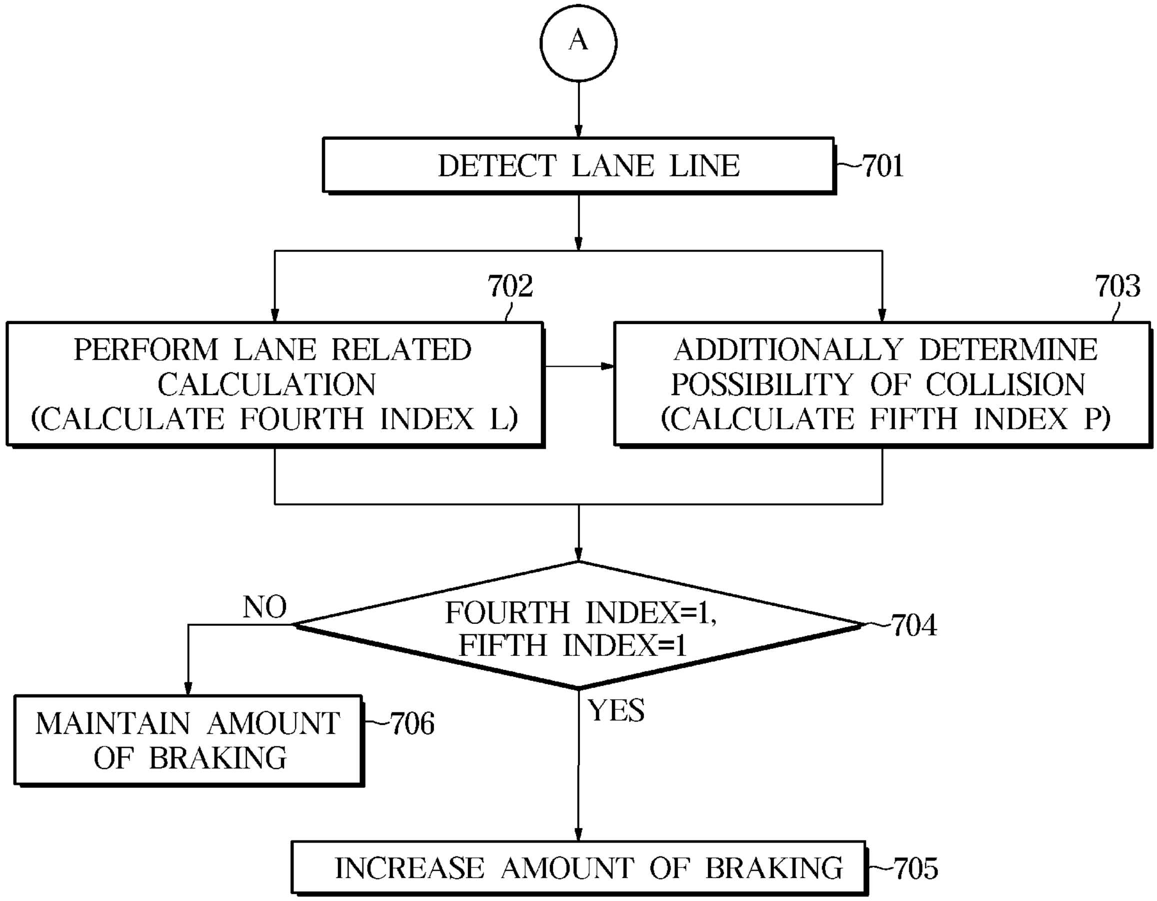
FIG. 7 is a flowchart of an example of a method of controlling a vehicle.

FIG. 7 is a flowchart of an example of a method of controlling a vehicle.

Meanwhile, each operation shown in FIG. 7 is to adjust the amount of deceleration in the FCA by additionally securing an index other than the first index V, the second index T, and the third index C when a lane line is found on a road surface while the control process shown in FIG. 3 is performed or after the control process shown in FIG. 3 is performed.

The controller 150 detects the lane line by processing the image data provided from the camera 110 (701). The controller 150 may calculate an index for additionally determining the possibility of collision between the vehicle 1 and the object 2 with reference to the lane line and determine a degree at which the vehicle 1 and the object 2 faces based on the index.

When the lane line is detected, the controller 150 may control the braking device 160 to adjust the amount of deceleration in the FCA function with reference to the result values of a fourth index L and a fifth index P.

The controller 150 calculates the fourth index L by performing a calculation related to the lane (702). Specifically, the controller 150 detects the lane line at left and right sides by processing the image data and determines whether the vehicle 1 travels at the center of the lane by acquiring a distance between a left lane line and a right lane line from the center of the vehicle 1. At the same time, the controller 150 calculates the fourth index L as 1 when detecting that the object 2 intersects the lane and calculates the fourth index L as zero when not detecting that the object 2 intersects the lane. Through the fourth index L, it may be estimated that the vehicle 1 and the object 2 are reversely traveling within the same lane.

Under the condition that the fourth index L is calculated as 1, the controller 150 calculates the fifth index P for additionally determining the possibility of collision between the vehicle 1 and the object 2 (703).

The controller 150 calculates the fifth index P as 1 when the object 2 is detected for a certain time or more within the lane of the vehicle 1 and the time in which the object 2 intersects the lane of the vehicle 1 is a certain time or less and is a preset second time or more.

The controller 150 can calculate the fifth index P, which is an index of the possibility of collision between the vehicle 1 and the object 2, as 1 when a third condition in which the vehicle 1 and the object 2 are present within the same lane for a certain time or more and a fourth condition in which the time in which the object 2 intersects the lane of the vehicle 1 is the certain time or less and is the preset second time or more are satisfied and calculate the fifth index P as zero when at least one of the third condition and the fourth condition is not satisfied.

When all of the first index V to the fifth index P are 1, the controller 150 may control the braking device 160 to increase the amount of braking to secure the additional amount of deceleration (705). In addition, the controller 150 may control the braking device 160 to increase the amount of braking to secure the additional amount of deceleration even when the lane is detected from the beginning and both the fourth index L and the fifth index P are calculated as 1. It is possible to increase the determination accuracy of the oncoming vehicle when an actual lane line is found. Therefore, the vehicle 1 can prevent the collision by securing the additional amount of deceleration or decrease the degree of injury even upon collision.

Meanwhile, the second preset time applied to the process of calculating the fifth index P may have a greater value than the first preset time applied to the process of calculating the third index C. This is because the actual lane has higher reliability than that of the virtual path.

Meanwhile, the controller 150 controls the braking amount to be maintained when any one of the fourth index L and the fifth index P is zero (706).

The configuration for implementing the disclosed disclosure and each operation implemented by the configuration have been described above. Hereinafter, an example of applying the above-described control method will be described with reference to FIGS. 8 to 11.

Figure 8:
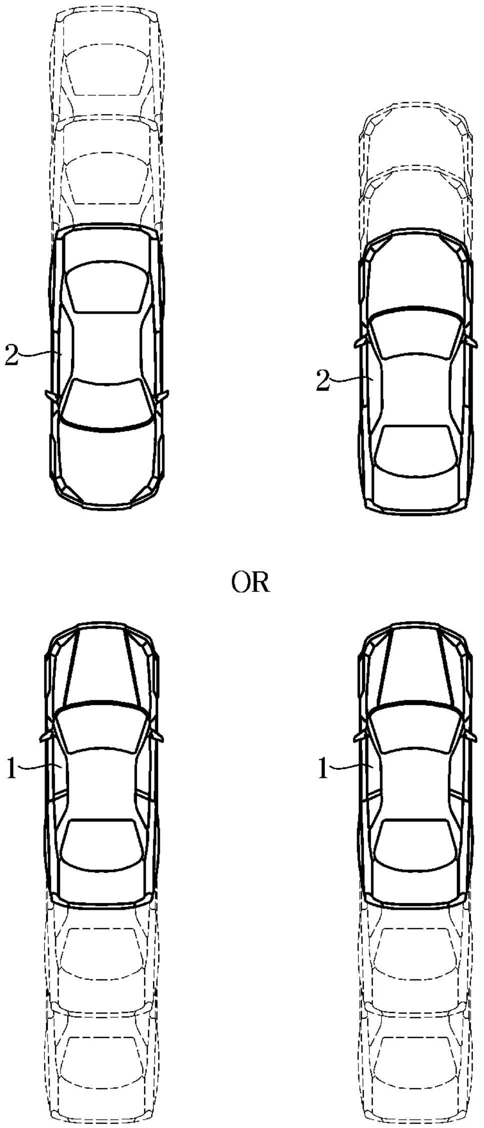
FIG. 8 is a diagram for describing an example of a result of controlling a vehicle in a situation in which there is no lane line information.

FIG. 8 is a view for describing a result of controlling a vehicle in a situation in which there is no lane line information.

Referring to FIG. 8, as a case in which there is no lane line on the road surface, the controller 150 may perform the FCA function based on the first index V to the third index C. In both (A) and (B), since the vehicle 1 and the object 2 travel within the same virtual path, the first index V to the third index C are output as 1, and the controller 150 may normally perform the FCA function even without lane line information.

Figure 9:
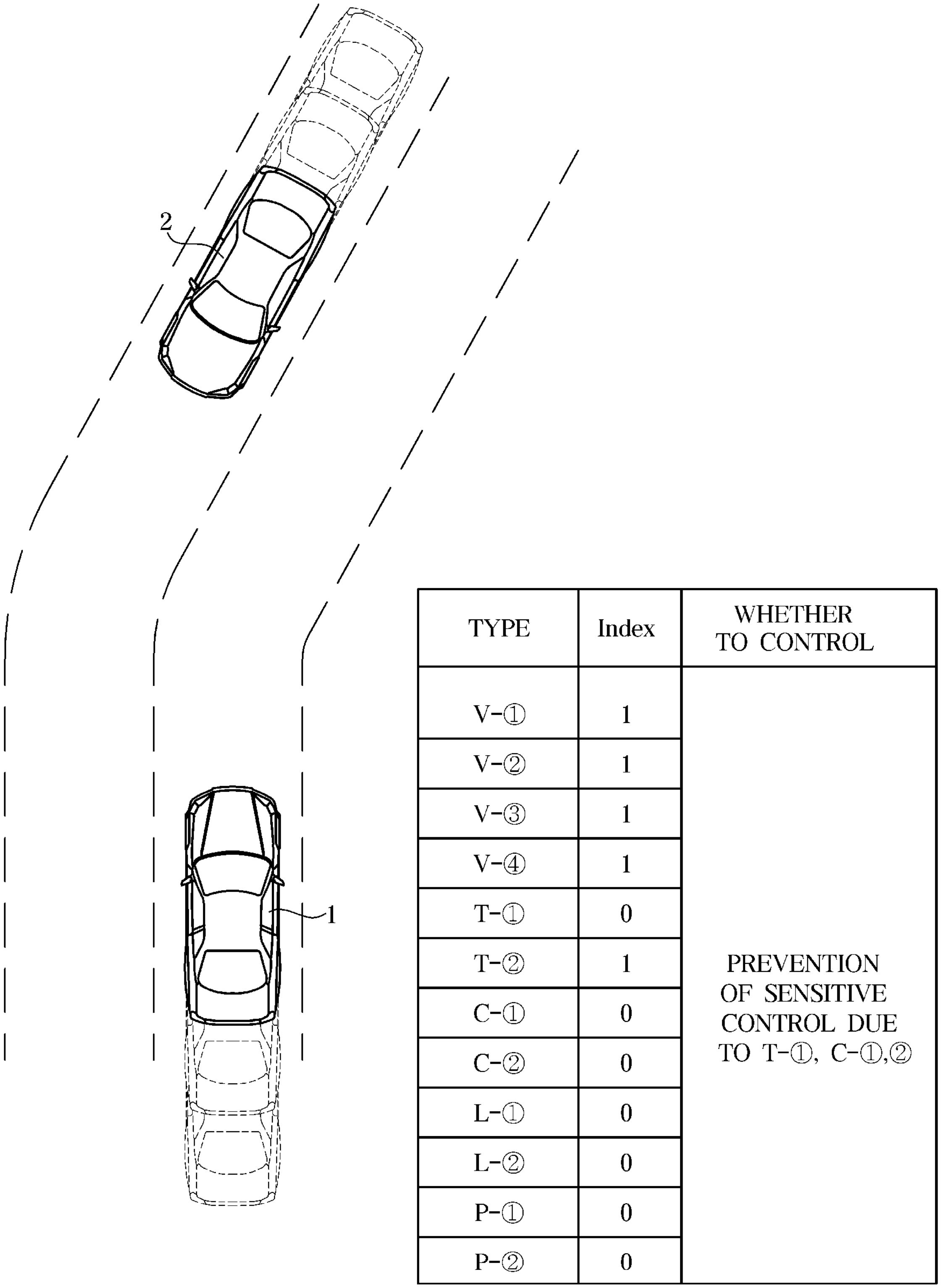
FIG. 9 is a diagram for describing an example of sensitive control prevention by the third index.
Figure 10:
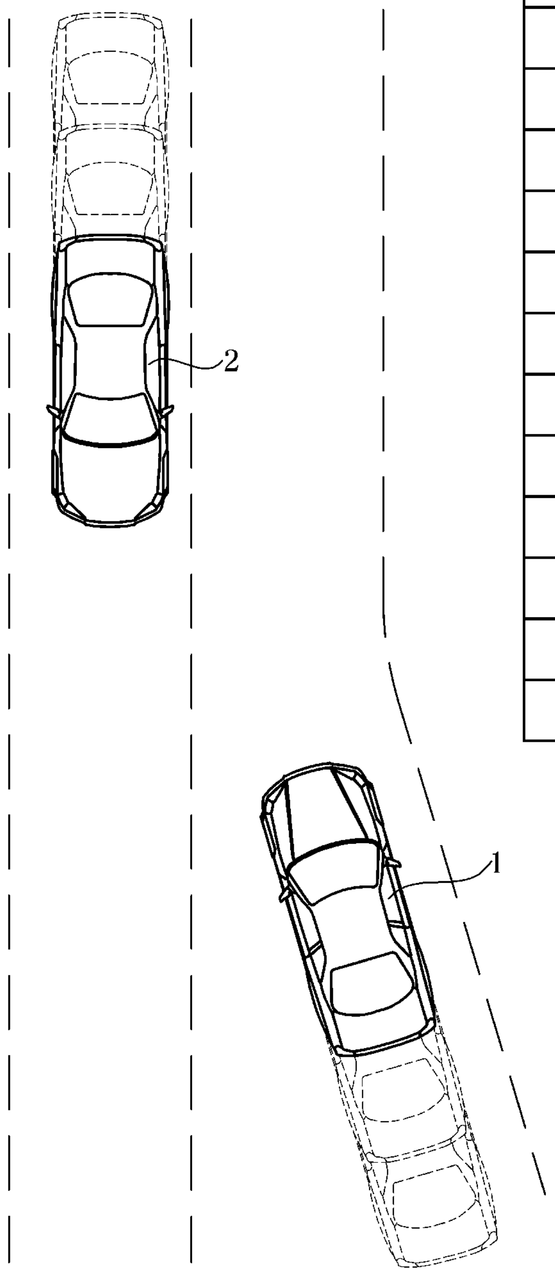
FIG. 10 is a diagram for describing an example of the sensitive control prevention by the third index.

FIGS. 9 and 10 are views for describing the sensitive control prevention by the third index.

As a process of calculating the third index C, FIG. 9 shows in a situation in which the time in which the object 2 intersects the virtual path of the vehicle 1 is not the certain time or less is not maintained for the preset first time or more. In FIG. 9, the collision between the vehicle 1 and the object 2 is expected based on the TTC but the sensitive control can be prevented by considering that the third index C is zero. In other words, the FCA function may be operated normally even in a curved traveling situation in which there is no lane line.

Likewise, as the process of calculating the third index C, FIG. 10 shows a situation in which the time in which the object 2 intersects the virtual path of the vehicle 1 is not the certain time or less is not maintained for the preset first time or more. It is possible to prevent the sensitive control by considering that the third index C is zero in a situation in which the vehicle 1 merges. In the conventional FCA situation, since the distance between the vehicle 1 and the object 2 is closer, the sensitive control occurs.

Figure 11:
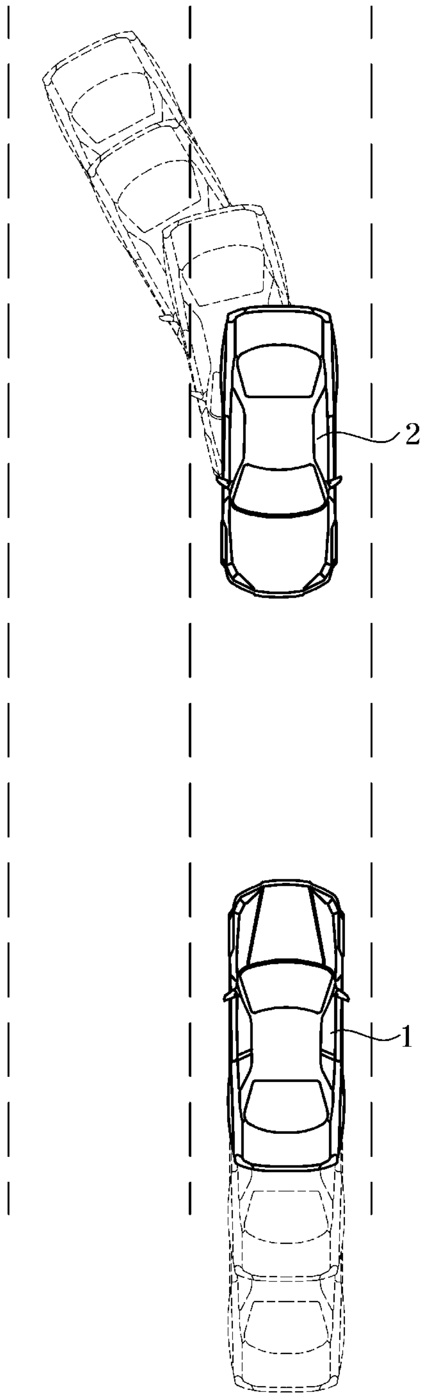
FIG. 11 is a diagram for describing an example of a result of securing an additional amount of deceleration in a situation in which there is lane line information.

FIG. 11 is a view for describing a result of securing an additional amount of deceleration in a situation in which there is lane line information.

Referring to FIG. 11, the vehicle 1 secures the additional amount of deceleration by calculating the first index V to the fifth index P. The first index V to the third index C are calculated as 1 and the FCA function is operated according to the default setting, but the fourth index L and the fifth index P are additionally calculated. Therefore, it is possible to cope with momentary collision by securing the additional amount of deceleration.

Meanwhile, the disclosed implementations may be implemented in the form of a recording medium configured to store instructions executable by a computer. The instructions may be stored in the form of program code and may perform the operations of the disclosed implementations by generating a program module when executed by a processor. The recording medium may be implemented as a computer-readable recording medium.

Computer-readable recording media includes all types of recording media in which the instructions readable by the computer are stored. For example, there may be a ROM, a RAM, a magnetic tape, a magnetic disc, a flash memory, an optical data storage device, and the like.

As is apparent from the above description, it is possible to provide a FCA function not dependent on whether a lane line is present and implement a robust advanced driver assistance system by securing an additional amount of deceleration in a situation in which the lane line is present.

What is claimed is:

1. A vehicle comprising:

a camera configured to capture an outside of the vehicle;

a radar configured to detect an object outside of the vehicle; and a controller configured to:

acquire a virtual path of the vehicle based on image data from the camera and radar data from the radar, perform forward collision-avoidance braking based on a time for the object to intersect the virtual path of the vehicle, and block, based on a traveling straightness of the vehicle being less than a certain level, a forward collision-avoidance assist (FCA) function from being performed, wherein the controller is configured to, based on (i) a lane line being detected, (ii) the object intersecting a lane being detected while the vehicle travels at a center of the lane between lane lines, and (iii) a time for the object to intersect the lane of the vehicle being less than or equal to a certain time and being maintained for greater than or equal to a preset second time, increase an amount of braking of a braking device.

2. The vehicle of claim 1, wherein the controller is configured to:

determine a first index indicating the traveling straightness of the vehicle based on at least one of a steering angle of the vehicle, a yaw rate of the vehicle, or a lateral movement amount of the vehicle, determine, based on the traveling straightness of the vehicle being greater than or equal to the certain level, the first index as one, and determine, based on the traveling straightness of the vehicle being less than the certain level, the first index as zero.

3. The vehicle of claim 2, wherein the controller is configured to:

determine a second index indicating traveling straightness of the object based on at least one of a heading angle of the object or a lateral position of the object with respect to the vehicle, determine, based on the traveling straightness of the object being greater than or equal to a certain level, the second index as one, and determine, based on the traveling straightness of the object being less than the certain level, the second index as zero.

4. The vehicle of claim 3, wherein the controller is configured to:

determine, based on (i) a first condition, in which the time for the object to intersect the virtual path of the vehicle is less than or equal to a certain time and is maintained for greater than or equal to a preset first time, being satisfied and (ii) a second condition, in which an area of a lateral overlap region where the virtual path of the vehicle overlaps a virtual path of the object is greater than or equal to a preset size, being satisfied, a third index as one, the third index indicating possibility of collision between the vehicle and the object, and determine, based on at least one of the first condition or the second condition not being satisfied, the third index as zero.

5. The vehicle of claim 4, wherein the controller is configured to, based on at least one of the first index, the second index, or the third index being zero, block the FCA function from being performed.

6. The vehicle of claim 4, wherein the controller is configured to set the preset second time to be greater than the preset first time.

7. The vehicle of claim 1, wherein the controller is configured to:

determine, based on the object intersecting the lane being detected while the vehicle travels at the center of the lane, a fourth index as one, and determine, based on the object intersecting the lane not being detected, the fourth index as zero.

8. The vehicle of claim 7, wherein the controller is configured to:

determine, based on (i) a third condition, in which the vehicle and the object are positioned on a same lane for time greater than or equal to a certain time, being satisfied and (ii) a fourth condition, in which the time for the object to intersect the lane of the vehicle is less than or equal to the certain time and is greater than or equal to the preset second time, being satisfied, a fifth index as one, the fifth index indicating possibility of collision between the vehicle and the object, and determine, based on at least one of the third condition or the fourth condition not being satisfied, the fifth index as zero.

9. The vehicle of claim 8, wherein the controller is configured to, based on at least one of the fourth index or the fifth index being zero, output the amount of braking as a pre-stored amount.

10. A method of controlling a vehicle, comprising:

acquiring a virtual path of the vehicle based on image data from a camera and radar data from a radar;

performing forward collision-avoidance braking based on a time for an object to intersect the virtual path of the vehicle;

blocking, based on a traveling straightness of the vehicle being less than a certain level, a forward collision-avoidance assist (FCA) function from being performed; and increasing, based on (i) a lane line being detected, (ii) the object intersecting a lane being detected while the vehicle travels at a center of the lane between lane lines, and (iii) a time for the object to intersect the lane of the vehicle being less than or equal to a certain time and being maintained for greater than or equal to a preset second time, an amount of braking of a braking device.

11. The method of claim 10, further comprising:

determining a first index indicating the traveling straightness of the vehicle based on at least one of a steering angle of the vehicle, a yaw rate of the vehicle, or a lateral movement amount of the vehicle;

determining, based on the traveling straightness of the vehicle being greater than or equal to the certain level, the first index as one; and determining, based on the traveling straightness of the vehicle being less than the certain level, the first index as zero.

12. The method of claim 11, further comprising:

determining a second index indicating traveling straightness of the object based on at least one of a heading angle of the object or a lateral position of the object with respect to the vehicle;

determining, based on the traveling straightness of the object being greater than or equal to a certain level, the second index as one; and determining, based on the traveling straightness of the object being less than the certain level, the second index as zero.

13. The method of claim 12, further comprising:

determining, based on (i) a first condition, in which the time for the object to intersect the virtual path of the vehicle is less than or equal to a certain time and is maintained for greater than or equal to a preset first time, being satisfied and (ii) a second condition, in which an area of a lateral overlap region where the virtual path of the vehicle overlaps a virtual path of the object is greater than or equal to a preset size, being satisfied, a third index as one, the third index indicating possibility of collision between the vehicle and the object; and determining, based on at least one of the first condition or the second condition not being satisfied, the third index as zero.

14. The method of claim 13, further comprising blocking, based on at least one of the first index, the second index, or the third index being zero, the FCA function from being performed.

15. The method of claim 13, wherein the preset second time is set to be greater than the preset first time.

16. The method of claim 10, further comprising:

determining, based on the object intersecting the lane being detected while the vehicle travels at the center of the lane, a fourth index as one; and determining, based on the object intersecting the lane not being detected, the fourth index as zero.

17. The method of claim 16, further comprising:

determining, based on (i) a third condition, in which the vehicle and the object are positioned on a same lane for greater than or equal to a certain time, being satisfied and (ii) a fourth condition, in which the time for the object to intersect the lane of the vehicle is less than or equal to the certain time and is greater than or equal to the preset second time, being satisfied, a fifth index as one, the fifth index indicating possibility of collision between the vehicle and the object; and determining, based on at least one of the third condition or the fourth condition not being satisfied, the fifth index as zero.

18. The method of claim 17, further comprising outputting, based on at least one of the fourth index or the fifth index being zero, the amount of braking as a pre-stored amount.

* * * * *